Feb. 21, 1928.

R. B. FAGEOL 1,660,189

MOTOR VEHICLE

Original Filed May 18, 1921   3 Sheets-Sheet 1

INVENTOR
ROLLIE B. FAGEOL

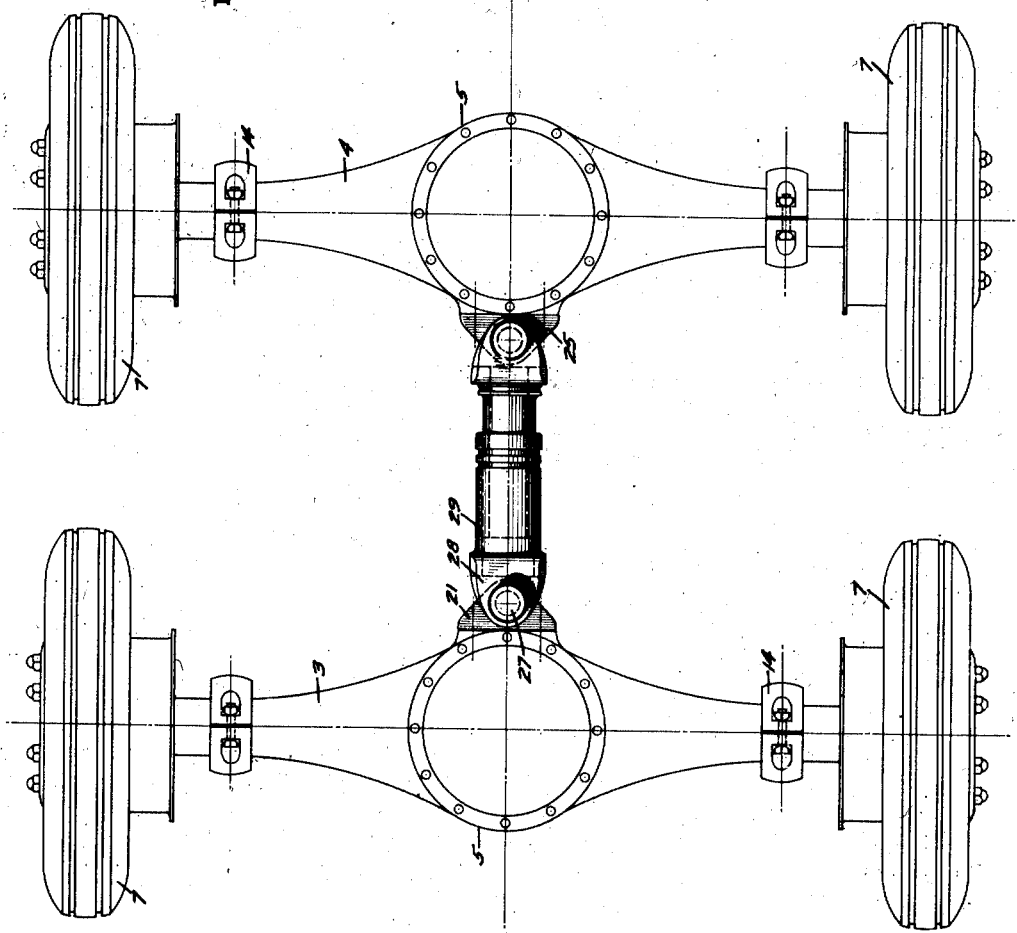

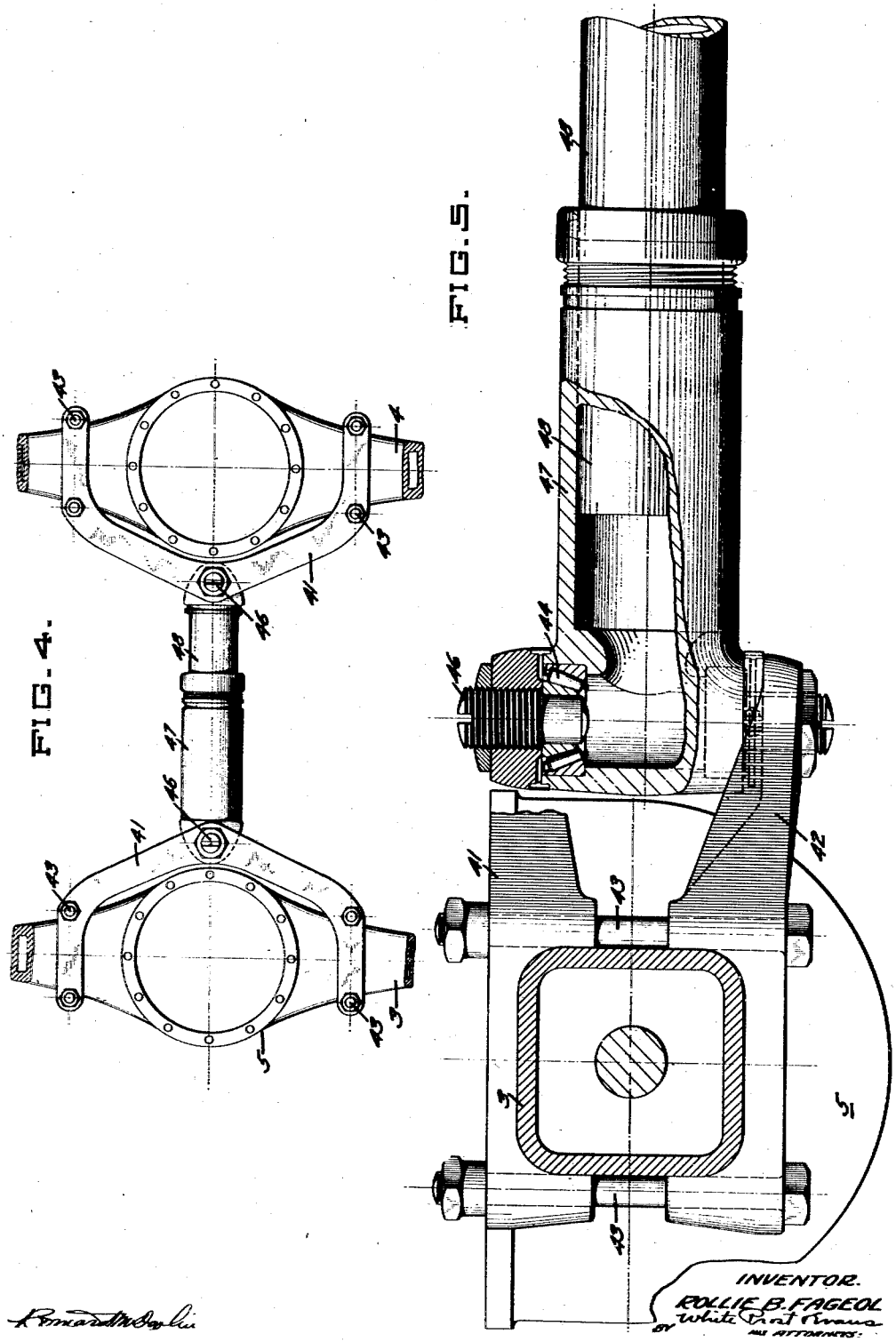

Patented Feb. 21, 1928.

1,660,189

UNITED STATES PATENT OFFICE.

ROLLIE B. FAGEOL, OF LOS ANGELES, CALIFORNIA, ASSIGNOR TO EIGHT WHEEL MOTOR VEHICLE COMPANY, OF SAN FRANCISCO, CALIFORNIA, A CORPORATION OF CALIFORNIA.

MOTOR VEHICLE.

Original application filed May 18, 1921, Serial No. 470,627. Divided and this application filed October 13, 1924. Serial No. 743,201.

The invention relates to motor vehicles and particularly to motor vehicles of the type having two driving axles arranged one behind the other at the rear end of the vehicle, and the present application is a continuation in part of copending application S. N. 470,627, filed May 18, 1921.

An object of the invention is to provide means for causing the torque imposed at one axle to oppose that imposed at the other axle.

Another object of the invention is to provide resilient means connecting the two axles together and to the frame in combination with means for preventing individual relative rotational movement of the respective axles while permitting relative separational movement of the axles and relative angular movement of the axles in the vertical planes of their respective axes.

Another object of the invention is to provide a flexible four-wheeled truck comprising two driving axles, one arranged behind the other, in which the axles are held in their proper relation with respect to each other, while at the same time permitting relative separational movement of the axles and relative angular movement of the axles in the vertical planes of their respective axes.

The invention possesses other advantageous features, some of which with the foregoing, will be set forth at length in the following description, where I shall outline in full that form of my invention which I have selected for illustration in the drawings accompanying and forming part of the present specification. In said drawings I have shown several different forms of four-wheeled driving trucks embodying my invention, but it is to be understood that I do not limit myself to such form, since the invention, as set forth in the claims, may be embodied in a plurality of other forms.

Referring to said drawings:

Figure 3 is a plan view of the two axle housings and the connecting torque neutralizing means.

Figure 4 is a plan view of the central portions of the two drive axle housings showing a modified form of torque neutralizing means.

Figure 5 is a vertical section through one of the axle housings shown in Figure 4 and through a portion of the torque neutralizing means.

My invention relates to motor vehicles having two or more drive axle housings arranged one behind the other at the rear end of the vehicle. The torque of the two housings, due to the driving force, is in the same rotational direction so that the adjacent sides of the two housings tend to move in opposite directions. The purpose of the present invention is to provide means for causing the torque of one housing to oppose that of the other housing. In accordance with my invention, I accomplish this result without interfering with the separational movement of the two housings, caused by variation in the flexure of the springs connecting the housings and without preventing relative angular movement of the housings in the vertical planes of their respective axes. This provides a very flexible four-wheeled truck which readily passes over rough roads or obstructions or depressions in roads without subjecting the axle housings, the springs or the vehicle frame to deleterious strain.

Figure 1:
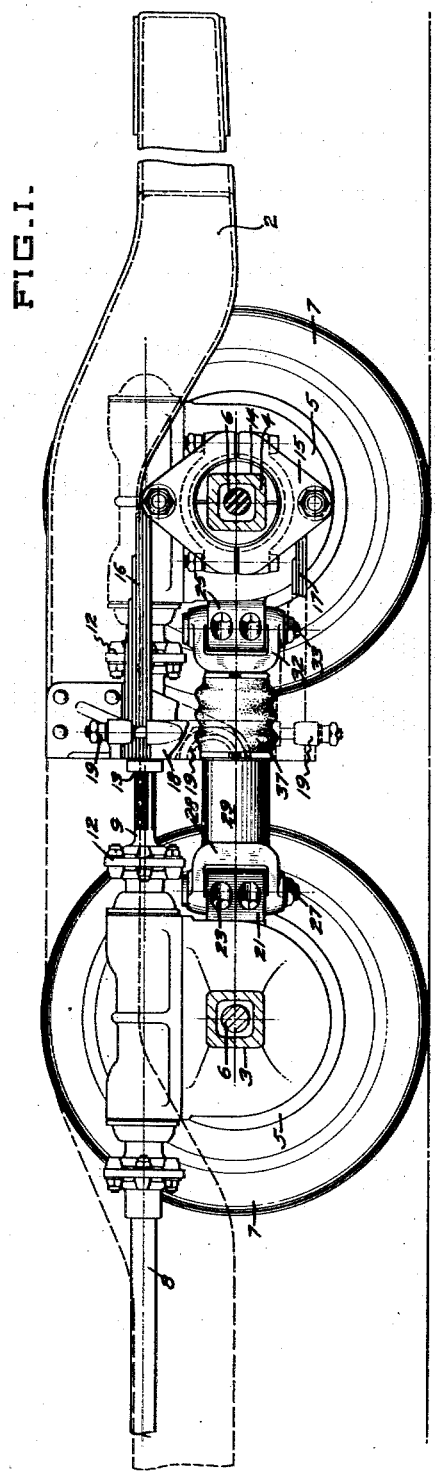
Figure 1 is a longitudinal vertical section of the rear end of a motor vehicle equipped with the driving mechanism of my invention, one-half of the section showing the spring connection between one of the driving axle housings and the vehicle frame and the other half of the section showing the means employed to neutralize the torque of the two axle housings.

In Figure 1 I have shown the rear end of a motor vehicle equipped with the devices of my invention. Disposed below the rear end of the vehicle frame 2 are two drive axle housings 3 and 4, the housing 4 being positioned behind the housing 3 and being normally parallel thereto. Each axle housing is provided at its center with a bell 5 in which is disposed the drive gear and the differential gears, to which the drive axle shafts 6 are connected. The shafts 6 are connected at their ends to wheels 7 which are journalled on the ends of the axle housings 3 and 4. Power is delivered to the rear axle drive shafts by the propeller shaft 8 and the intermediate shaft 9 extending from the front axle housing 3 into the rear axle housing 4. The shaft 9 is provided with suitable universal joints 12 and with a slip joint 13 to accommodate the separational movement of the housings and the relative angular movement of the housings in the vertical planes of their respective axes. Secured to each axle housing adjacent each end thereof is a spherical zonal bearing member 14 and a spring mounting 15 is journalled on each bearing member. Due to the spherical form of the bearing member, the spring mounting has a universal movement with respect to the housing, so that movement of the housing will not introduce strains into the springs. The two spring mountings on the same side of the frame are connected together by leaf springs 16 and 17, the springs being preferably substantially flat and being pivoted at their ends to the spring mountings. The spring 16 is connected at its ends to the two spring mountings on the same side of the frame, above the axle housings, and the spring 17 is connected at its ends to the spring mountings below the axle housings. The springs are spaced apart at their centers by a bearing block 18 and the springs are suitably clamped to the bearing block by bolts 19. This arrangement of springs and spring mountings prevents rotation of the spring mountings with respect to each other, the vertical axes of the spring mountings being always substantially parallel. The bearing block 18 is journalled on about trunnion shafts 19 secured to or mounted in the vehicle frame, so that the truck formed by the two pairs of springs 16 and 17 and the two axle housings 3 and 4 may oscillate about the shafts 19. This provides extreme flexibility of the truck and prevents the introduction of deleterious strains into the springs or vehicle frame, as the vehicle moves over an uneven road.

Figure 2:
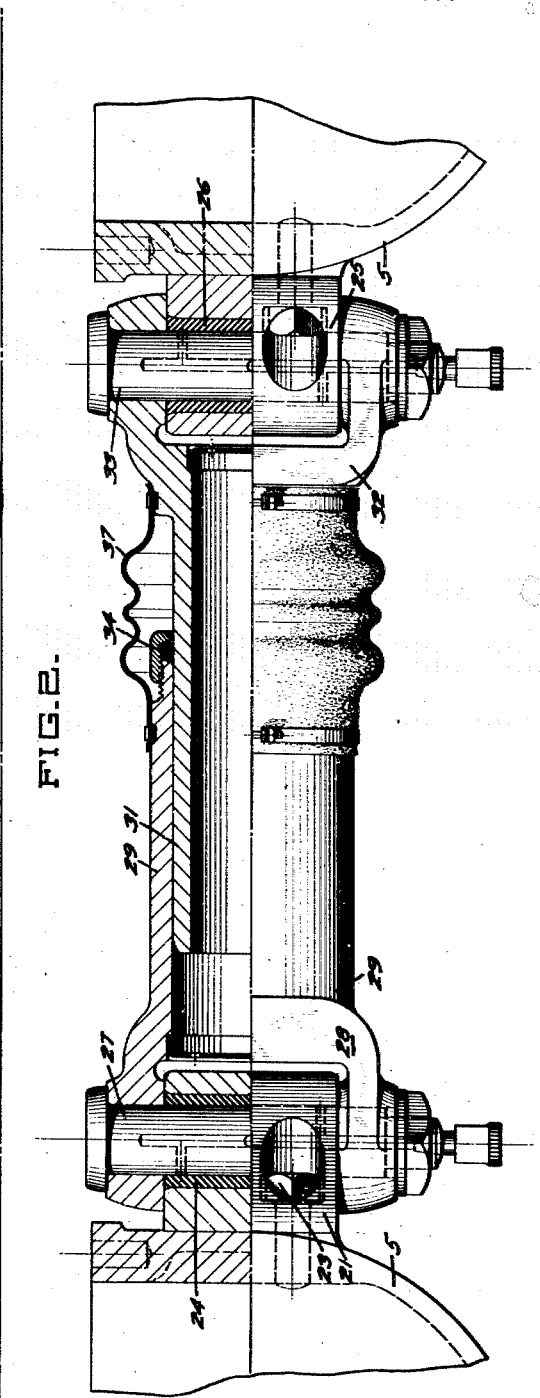
Figure 2 is a longitudinal vertical section on a larger scale, of the torque neutralizing means.

Means are provided for causing the torque imposed on one axle housing to oppose that imposed on the other axle housing, so that the torque of the two housings is neutralized. Referring particularly to the structures shown in Figures 1, 2 and 3, the front axle housing 3 is provided at its center and on the back face thereof with a boss or bearing member 21.

The bearing member 21 is secured to the bell 5 of the front axle housing 3 by capscrews 23 and is provided with a vertically disposed bearing surface 24. The bell 5 of the rear axle housing 4 is similarly provided with a bearing member 25 having a vertically disposed bearing surface 26. Disposed in the bearing member 21 is a vertical pin 27, which passes through holes in the yoke 28 which is formed integral with the outer tube 29. The tube 29 is thus connected to the front axle housing 3 by a vertical pivot, so that the tube 29 is free to swing transversely only with respect to the axle housing 3. The tube 29 has a cylindrical inner surface, and arranged within the tube and forming a slidable and rotatable joint therewith is an inner tube 31 which is provided on its end with a yoke 32 through which extends the vertically disposed pin 33 which passes through the bearing member 25. The tubes 31 and 29 are in telescopic engagement and, due to the close fit of the tube 31 in the tube 29, the telescopic structure is rigid against lateral strain. The telescopic movement of the two parts permits relative separational movement of the two axle housings 3 and 4 and the journalling of the tube 31 in the tube 29 permits relative angular movement of one housing in the vertical plane of its axis with respect to the other housing. The telescopic structure prevents rotational movement of one housing with respect to the other and causes the torque imposed at one axle to oppose that imposed at the other axle, so that the torques are neutralized.

The contacting faces of the tubes 29 and 31 are kept clean and lubricated by the felt ring 34 contacting with the outer surface of the tube 31. Said outer surface is further maintained clean and free of dirt by a flexible housing 37 surrounding the projecting portion of the tube 31 and being secured at its opposite ends to the tube 29 and the yoke portion 32 of the tube 31.

In Figures 4 and 5 I have shown a modified form of construction, in which the mechanism of my invention is applied to standard axles. Such axles are provided with central bells 5 and I have provided clamps, engageable with the axle housings on opposite sides of the bells and spanning the bells, to provide bearings for the telescopic tube. In this construction, as in that just described, the axis of the telescopic tube is in alinement with the centers of the two axles but this construction is not essential, since the tube may be placed to one side or the other of the center line of the vehicle frame and it is not essential that it be placed midway between the ends of the axles. The bearing supporting member comprises two U-shaped clamps 41—42 which are secured to the axle housing by bolts 43, one clamp lying above and the other lying below the housing. The bolts are disposed on opposite sides of the central bell 5 and the U-shaped members span the bell, the member clamped to the front axle housing 3 being disposed behind the bell and the member clamped to the rear axle housing 4 being disposed in front of the bell. Each clamping member is provided with a bearing support in which is disposed a steep angle roller bearing 44, the inner race of the bearing being adjustable by the screw 46, so that any wear of the bearings may be readily taken up. Journalled on the bearings in the U-shaped member secured to the front axle housing 3 is a tube 47 which is in telescopic engagement with a tube 48 which is connected to the U-shaped member clamped to the rear axle housing 4 in the same manner as the tube 47 is connected to the U-shaped member associated with the front axle housing 3. This modified form of telescoping tube mounting presents all of the advantages of the structure shown in Figure 2 and at the same time provides for the application of this invention to standard axles.

I claim:

1. A road vehicle including a frame, tandem axles, housings for said axles, springs connecting the axles and said frame, said springs being pivotally attached to said frame so that the axles are capable of substantial independent bodily swinging movement relative to the frame about the spring pivots and movement toward and from each other due to spring deflection, torque resisting means separate from said springs designed to prevent the rotation of the housings about the axles, said last named means being extensible and flexible except in substantially vertical planes to permit the substantially unrestricted movement of the axles incident to their connection to the frame, while rigidly resisting the torque tending to rotate the housings about the axles.

2. A road vehicle including a frame, tandem axles, housings for said axles, springs interconnecting the axles and the frame, said springs being pivotally attached to said frame and connected to said axles so that the axles are capable of substantial independent bodily swinging movement relative to the frame about the spring pivots, said axles being free of restricting connections preventing movement of the axles toward and from each other due to spring deflection, torque resisting means extending between said housings, said means being extensible endwise, and flexible except in substantially vertical longitudinal planes, whereby the reactions due to the driving torque are resisted independently of said springs without substantially restricting the movement of the axles incident to their connection to the frame.

3. A road vehicle including a frame, tandem driven axles, housings for said axles, means for driving said axles, said means including an extensible and flexible shaft extending between said housings, springs interconnecting the axles and the frame, said springs being pivotally attached to said axles so that frame and connected to said axles so that the axles are capable of substantial independent bodily swinging movement relative to the frame about the spring pivots, torque resisting means extending between said housings, said means being extensible endwise and flexible except in substantially vertical and longitudinal planes, whereby said torque resisting means maintains the axis of said flexible shaft substantially in alignment.

4. A road vehicle including a frame, tandem driven axles, housings for said axles, springs pivotally connected to said frame and housings, said springs causing upon deflection movement of one housing toward or away from the other, torque resisting means between said housings, said last named means centrally comprising a link pivoted at its opposite ends to said housings on vertical pivots and including two elements relatively rotatable about the longitudinal axis of the link, said link being extensible and contractible to permit the movement of the axles incident to their connection to the frame.

5. A road vehicle including a frame, tandem axles, housings for said axles, springs connecting the axles and said frame, said springs being pivotally attached to said frame so that the axles are capable of substantial independent bodily swinging movement relative to the frame about the spring pivots and movement toward and from each other due to spring deflection, torque resisting means separate from said springs designed to prevent the rotation of the housings about the axles, said last named means comprising a link pivoted to the housings on vertical pivots, said link being composed of two elements slidable endwise of each other and rotatable relative to each other about the longitudinal axis of the link, said link being rigid to forces tending to rotate the housings about the axles, whereby the torque reactions are resisted without substantially restricting any of the movements of the axles permitted by their connection to the frame.

In testimony whereof, I have hereunto set my hand.

ROLLIE B. FAGEOL.